(12) United States Patent
Gueret et al.

(10) Patent No.: US 11,386,335 B2
(45) Date of Patent: Jul. 12, 2022

(54) SYSTEMS AND METHODS PROVIDING EVOLUTIONARY GENERATION OF EMBEDDINGS FOR PREDICTING LINKS IN KNOWLEDGE GRAPHS

(71) Applicant: Accenture Global Solutions Limited, Dublin (IE)

(72) Inventors: Christophe Gueret, Donabate (IE); Luca Costabello, Newbridge (IE)

(73) Assignee: Accenture Global Solutions Limited, Dublin (IE)

( * ) Notice: Subject to any disclaimer, the term of this patent is extended or adjusted under 35 U.S.C. 154(b) by 534 days.

(21) Appl. No.: 16/590,738

(22) Filed: Oct. 2, 2019

(65) Prior Publication Data

US 2021/0103826 A1 Apr. 8, 2021

(51) Int. Cl.
*G06N 5/02* (2006.01)
*G06F 17/16* (2006.01)
*G06F 16/22* (2019.01)
*G06F 16/2457* (2019.01)
*G06F 17/18* (2006.01)

(52) U.S. Cl.
CPC ........... *G06N 5/02* (2013.01); *G06F 16/2237* (2019.01); *G06F 16/24578* (2019.01); *G06F 17/16* (2013.01); *G06F 17/18* (2013.01)

(58) Field of Classification Search
CPC .......... G06N 5/02; G06F 17/16; G06F 17/18; G06F 16/2237; G06F 16/24578

USPC .......................................................... 706/45
See application file for complete search history.

(56) References Cited

U.S. PATENT DOCUMENTS

| | | | | |
|---|---|---|---|---|
| 10,516,684 | B1* | 12/2019 | Jiang | G06F 21/552 |
| 2018/0060733 | A1* | 3/2018 | Beller | G06N 20/00 |
| 2018/0060734 | A1* | 3/2018 | Beller | G06N 20/00 |
| 2018/0336183 | A1* | 11/2018 | Lee | G06N 3/08 |
| 2020/0074301 | A1* | 3/2020 | Shang | G06N 3/08 |
| 2020/0342055 | A1* | 10/2020 | Patra | G06N 5/003 |

OTHER PUBLICATIONS

Ebisu, Takuma, et al., "TorusE: Knowledge Graph Embedding on a Lie Group", AAAI '18, Article No. 222, ©Association for the Advancement of Artificial Intelligence, Feb. 2018, pp. 1819-1826.*
Huang, Xiao, et al., "Knowledge Graph Embedding Based Question Answering", WISDM '19, Melbourne, VIC, Australia, Feb. 11-15, 2019, pp. 105-113.*
Wang, Quan, et al., "Knowledge Graph Embedding: A survey of Approaches and Applications", TKDE 2017, vol. 29, Issue 12, Dec. 1, 2017, pp. 2724-2743.*

(Continued)

*Primary Examiner* — Robert Stevens
(74) *Attorney, Agent, or Firm* — Crowell & Moring LLP

(57) ABSTRACT

Complex computer system architectures are described for analyzing data elements of a knowledge graph, and predicting new facts from relational learning applied to the knowledge graph. This discovery process includes converting the knowledge graph into a set of candidate embeddings spaces to apply further analysis to rank the set of candidate embeddings spaces, where the top ranked candidate embeddings spaces are further processed to identify the new facts.

20 Claims, 8 Drawing Sheets

(56) References Cited

OTHER PUBLICATIONS

Wang, Zhen, et al., "Knowledge Graph Embedding by Translating on Hyperplanes", AAAI '14, ©Association for the Advancement of Artificial Intelligence, Jul. 2014, pp. 1112-1119.*

Xiong, Chenyan, et al., "Explicit Semantic Ranking for Academic Search via Knowledge Graph Embedding", WWW 2017, Perth, Australia, Apr. 3-7, 2017, pp. 1271-1375.*

\* cited by examiner

SYSTEMS AND METHODS PROVIDING EVOLUTIONARY GENERATION OF EMBEDDINGS FOR PREDICTING LINKS IN KNOWLEDGE GRAPHS

TECHNICAL FIELD

Complex computer system architectures are described for analyzing data elements of a knowledge graph, and predicting new facts from relational learning applied to the knowledge graph. This discovery process takes advantage of the knowledge graph structure to improve the computing capabilities of a device executing a discovery calculation by applying both training and inference analysis techniques on the knowledge graph within an embedding space, and generating a scoring strategy for predicting facts that may be discoverable from the knowledge graph. The discovery of facts may be applied to models for artificial intelligence (AI) applications.

BACKGROUND

Data stored in a knowledge graph format is presented to reflect relations between specific concepts within the knowledge graph. Even so traditional approaches for discovering information from a knowledge graph rely on the presence of a "negative" secondary knowledge graph representing relations between concepts that do not exist in the knowledge graph. The machine learning process supporting the discovery is optimized towards differentiating between the knowledge graph to learn and the secondary negative knowledge graph to avoid.

DETAILED DESCRIPTION

Figure 1:
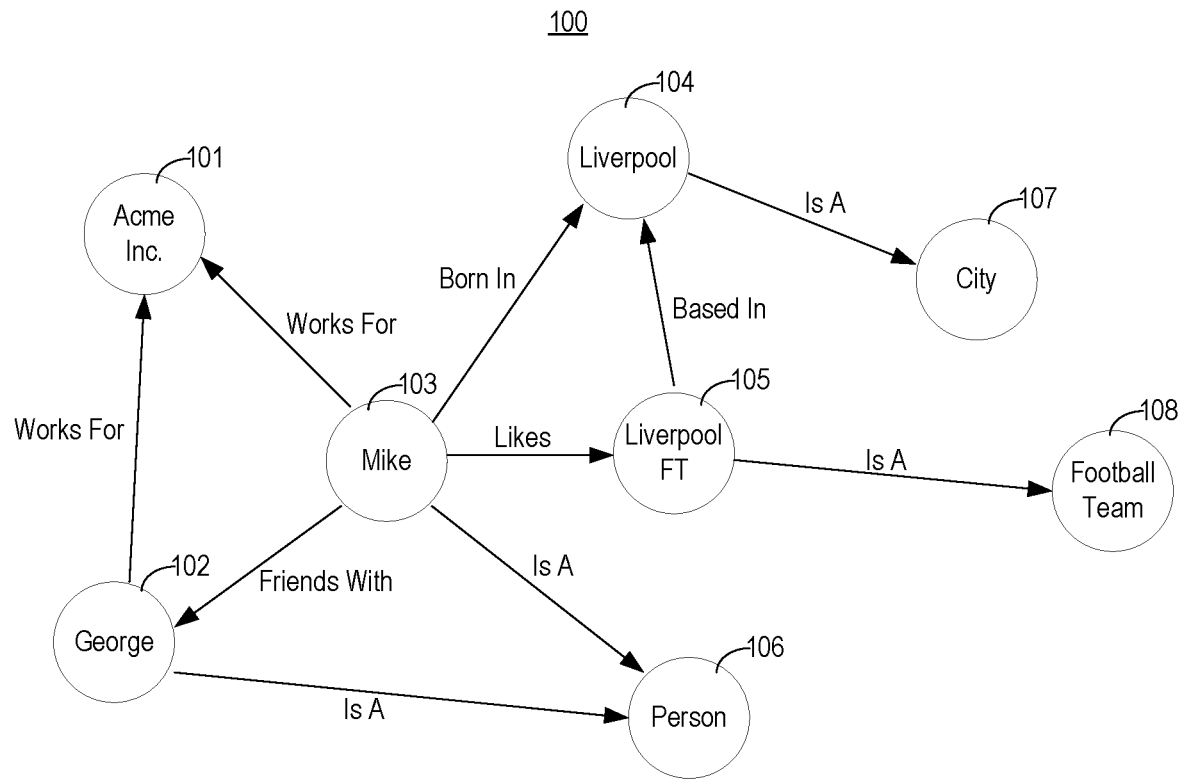
FIG. 1 shows an exemplary knowledge graph, according to some embodiments.

According to some embodiments, a computing device is disclosed, where the computing device comprises a data reception circuitry configured to receive a knowledge graph including a set of structured data, and a knowledge graph embedding circuitry. The knowledge graph embedding circuitry is configured to select a sampled set of vector triples from the knowledge graph, convert the knowledge graph to a set of candidate embeddings spaces, wherein each of the candidate embeddings spaces includes a different set of vectors representing the sampled set of vector triples from the knowledge graph. The computing device may further comprise a processing circuitry configured to calculate a weighted mean reciprocal rank of the sampled set of vector triples for each of the candidate embeddings spaces, determine a respective fact score for each of the candidate embeddings spaces based on the weighted mean reciprocal rank calculation, rank the candidate embeddings spaces according to their respective fact scores and select a predetermined number of the highest ranked candidate embeddings spaces when a stopping condition is met.

According to some embodiments, a method is disclosed comprising receiving, by a reception circuitry, a knowledge graph including a set of structured data, selecting, by a knowledge graph embedding circuitry, a sampled set of vector triples from the knowledge graph, converting, by the knowledge graph embedding circuitry, the knowledge graph to a set of candidate embeddings spaces, wherein each of the candidate embeddings spaces includes a different set of vectors representing the sampled set of vector triples from the knowledge graph, calculating, by a processing circuitry, a weighted mean reciprocal rank of the sampled set of vector triples for each of the candidate embeddings spaces, determining, by the processing circuitry, a respective fact score for each of the candidate embeddings spaces based on the weighted mean reciprocal rank calculation, ranking, by the processing circuitry, the candidate embeddings spaces according to their respective fact scores, and selecting, by the processing circuitry, a predetermined number of the highest ranked candidate embeddings spaces when a stopping condition is met.

According to some embodiments, a computing device is disclosed comprising a processing circuitry, and a non-transitory storage medium configured to store instructions that, when executed, causes the processing circuitry to receive a knowledge graph including a set of structured data, select a sampled set of vector triples from the knowledge graph, convert the knowledge graph to a set of candidate embeddings spaces, wherein each of the candidate embeddings spaces includes a different set of vectors representing the sampled set of vector triples from the knowledge graph, calculate a weighted mean reciprocal rank of the sampled set of vector triples for each of the candidate embeddings spaces, determine a respective fact score for each of the candidate embeddings spaces based on the weighted mean reciprocal rank calculation, rank the candidate embeddings spaces according to their respective fact scores, and select a predetermined number of the highest ranked candidate embeddings spaces when a stopping condition is met.

To take advantage of the benefits offered by big data technologies, enterprise systems have access to large, and rapidly growing, volumes of information, both proprietary and public. Existing analytical applications and data warehousing systems have not been able to fully utilize this profound access to information. Oftentimes information is simply aggregated into large data lakes or data warehouses without the inclusion of an added layer of relationship data connecting the information. Such aggregation of large amounts of data without contextual or relational information are data dumps that are not particularly useful. Information stored in data lakes and data warehouses are likely to be stored in their original format, thus expending large amounts of computing resources to extract, transform, and load (ETL) the information into a searchable data set to respond to a data query.

Generally, a knowledge graph includes a knowledge base of relevant information structured in a graph presentation that captures entities (i.e., nodes), relationships (i.e., edges), and attributes (i.e., node properties or edge properties) with semantic meaning. This graph type of data structure model offered by the knowledge graph provides semantic meaning of the included data, by modeling data with an ontology or taxonomy. Accordingly, technical improvements are realized when a computing device structures information into knowledge graphs and runs search queries on the knowledge graphs, which specifically result in the retrieval of more relevant and accurate information, in a shorter amount of time.

Accordingly, a knowledge graph is disclosed that offers an innovative data structure for presenting relevant information, as well as depicting relationships between the relevant information. To further take advantage of the unique characteristics of a knowledge graph, this disclosure also describes technical strategies for predicting new facts that are derived from the existing information in the knowledge graph. Discovering these new facts may be inferred from the information presented by the knowledge graph, and may not have otherwise been predicted according to other information discovery strategies previously applied to a knowledge graph.

Existing prediction feedback models rely on the presence of a negative knowledge graph when learning how to make predictions. The requirement for this negative knowledge graph increases the amount of resources needed for training and poses a risk related defining what is a negative fact.

It follows that the feedback models described herein utilize relational learning techniques to predict and discover new facts from the data stored in the knowledge graphs. By utilizing the knowledge graph and relational learning techniques, the described models provide technical strategies for analyzing data that are more efficient and conserve on the finite resources available to an enterprise applying, for example, artificial intelligence (AI) and machine learning (ML) models. It should be noted that the features described herein are applicable to knowledge graphs of data across various fields of technology or interest.

The specific feedback models described herein utilizes an embeddings space generator to convert the knowledge graph into coordinate points in one or more candidate embeddings spaces. This conversion step is implemented as the information disclosed by the knowledge graph is more effectively analyzed when they are analyzed under their representation by the coordinate points in the Cartesian space of the embeddings spaces. To select an embeddings space that "best" represents the knowledge graph, the candidate embeddings spaces are ranked until a stopping condition is met. The final embeddings space(s) that are selected from this ranking process will further be used to conduct the discovery process for discovering a new facts from the input knowledge graph.

By using this ranking and selection solution, the feedback models described herein are able to accomplish their goals of discovering new facts without relying on negative examples (i.e., negative facts) to train their models with. This is an overall technical improvement from other feedback models that train their models using such negative examples, given the conservation of computing resources from not having to generate the negative examples. For example, training models with negative examples may require a large training set of negative examples, which takes a large amount of processing resources to generate, and a large amount of data storage resources to store. Therefore, the present feedback model offers a technical solution that vastly conserves computing resources as it removes the requirement to generate such large datasets of negative examples for model training purposes.

According to some embodiments, as negative facts are crafted, there is a risk that what would have been new predicted positive facts are first created, introduced, and trained against, as negative facts. So the use of negative examples during the training process is not desirable as it may affect the training process, and alter the opportunity or probability that the negative training fact is later selected as the final fact. So by lowering the importance such negative examples when being applied during the training process, the present feedback model actually offers a larger scope of possible candidate embeddings. The present feedback model uses negative facts to, for example, only validate candidate embeddings.

While the majority of the disclosure describes the present feedback model as removing the use of negative examples from the training process entirely, other embodiments are within the scope of this disclosure that applies the use of some negative examples. According to these other embodiments, instead of removing the use of negative examples from the training process entirely, the use of negative examples is limited to validating models so that the importance of the negative examples is reduced. Negative examples are then incorporated into the fitness metric used to ranked candidate embedding spaces. The ratio of positive to negative examples that are used during training may substantially favor the use of positive examples, and in some embodiments no negative examples may be used for training. The ratio of positive to negative examples that are used during training may be set to a predetermined ratio.

To begin, FIG. 1 shows an exemplary knowledge graph (KG) 100, which may represent a whole knowledge graph or at least a portion of a larger overall knowledge graph according to some embodiments. The KG 100 includes nodes 101-108, and edges in-between that connect the nodes 101-108. Each of the nodes 101-108 represent a concept, while the edges between the nodes 101-108 describes a relationship between the connected nodes 101-108. The KG 100 may be interpreted as a collection of facts represented by specific data triples. Each triple is an atomic unit of knowledge for the KG 100 that includes three data points that are connected on the KG 100. A triple may take the form of {subject, predicate, object}. An exemplary triple from the KG 100 includes: {Mike, likes, Liverpool FT}, {Liverpool FT, Is A, Football team}, {George, Works For, Acme Inc.}, and so on.

Figure 2:
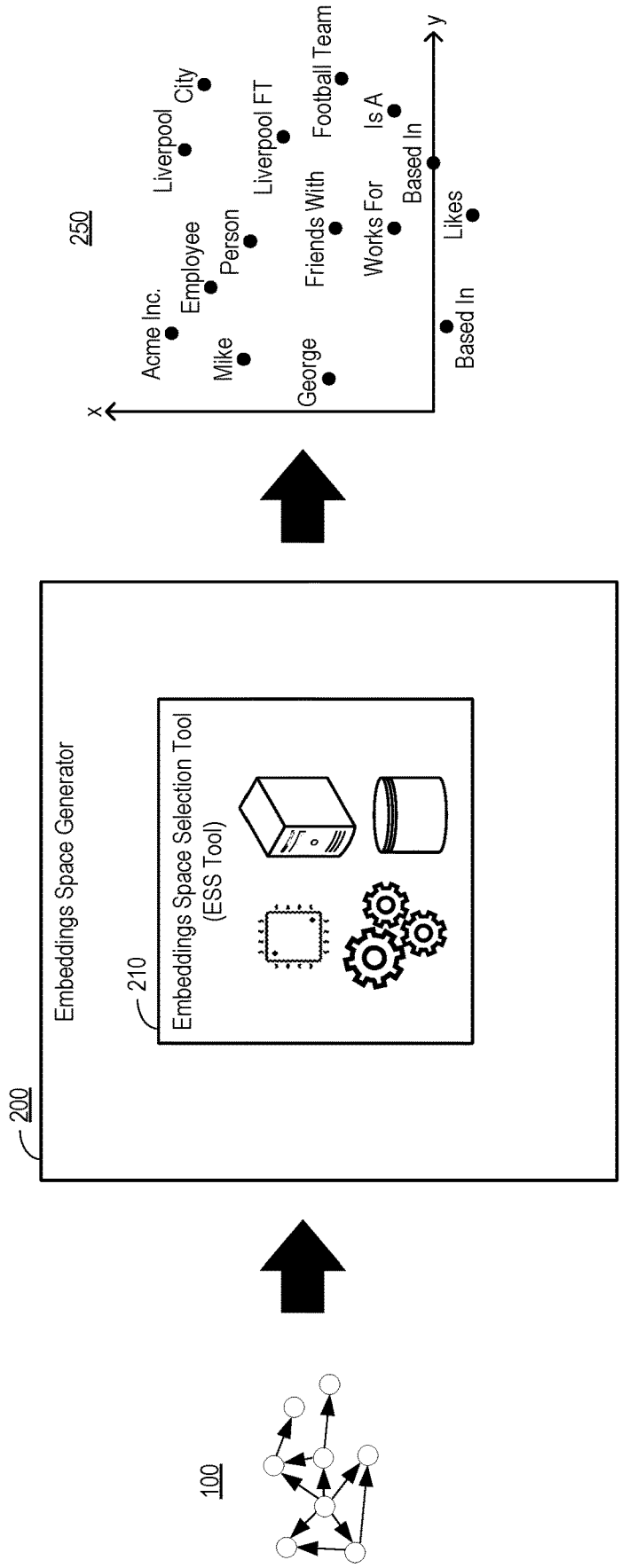
FIG. 2 shows an exemplary block diagram for an embeddings space generator utilized to obtain an embeddings space, according to some embodiments.

FIG. 2 shows an exemplary block diagram of an embeddings space generator 200 used for obtaining a plurality of candidate embeddings spaces for consideration using the rankings strategy described in more detail herein. After implementing the rankings strategy across the candidate embeddings spaces, the embeddings space generator 200 will select one or more of the candidate embeddings spaces having the highest scores to be selected as the "best" embedding space for subsequent scoring. The embeddings space generator 200 may be comprised of software, hardware, middleware, application programming interface (API), or other components for implementing the corresponding features of the embeddings space generator 200. Furthermore, an embeddings space selection tool (ESS tool) 210 may be executing to control the embeddings space generator 200 to implement the features described herein. The ESS tool 210 may be a sub-system of the embeddings space generator 200 comprising software, hardware, middleware, application programming interface (API), or other components for implementing the corresponding features of the ESS tool 210.

As shown in FIG. 2, the embeddings space generator 200 receives the KG 100 as an input. From the KG 100 input, the embeddings space generator 200 applies the ranking and selection features by the ESS tool 210, and outputs a selected embeddings space 250 (i.e., "best" embeddings space), where the selected embeddings space 250 includes point coordinates that represent each of the data points included in the KG 100 (e.g., nodes and/or edges from the KG 100). The selected embeddings space 250 is a metric space (e.g., Cartesian space) having one or more dimensions, and is a representation of an embeddings space that includes point coordinate representations of the data included in the knowledge graph 100. The point coordinate information from the selected embeddings space 250 will then be used to run further prediction analysis, as described later with reference to at least scoring process described in FIGS. 4 and 5.

The selected embeddings space 250 shown in FIG. 2 is depicted as having two dimensions. However, the embeddings space generator 200 may create the selected embeddings space 250 to include additional dimensions. Within the selected embeddings space 250, are point coordinates that represent the data points from the KG 100. According to some embodiments, the selected embeddings space 250 may include point coordinates for some, or all, of the data included in the KG 100. By converting the KG 100 into the selected embeddings space 250, the resulting coordinate values are representative of the data from the KG 100 which may now be analyzed using algebraic calculations and/or algorithms to determine the new fact predictions.

Figure 3A:
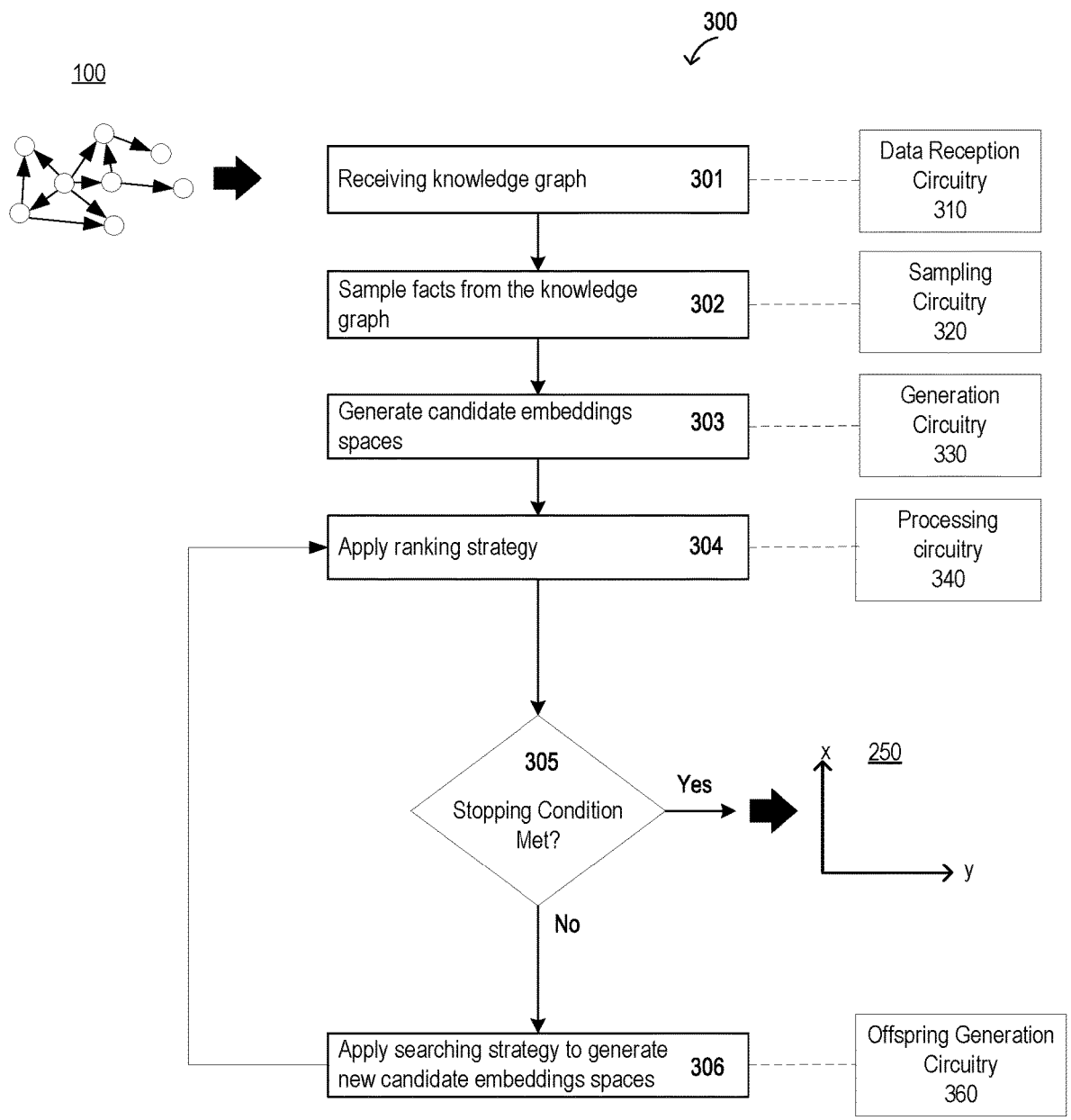
FIG. 3A shows an exemplary flow diagram describing a process for ranking and selecting an embeddings space, according to some embodiments.

FIG. 3A shows an exemplary flow diagram 300 describing a process implemented by the ESS tool 210 for receiving the KG 100 as an input, generating a set of candidate embeddings spaces that represent the KG 100, ranking the set of candidate embeddings spaces, and selecting a "best" embeddings space from the set of candidate embeddings spaces, where the selected embeddings space is later used to determine the new fact. The description of flow diagram 300 makes reference to circuitry, where circuitry may include specific sub-systems of the embeddings space generator 200 comprising software, hardware, middleware, application programming interface (API), or other components for implementing the corresponding features of the circuitry.

At 301, the ESS tool 210 receives the KG 100. The reception of the KG 100 may be implemented by a data reception circuitry 310 of the embeddings space generator 200. The KG 100 may be stored in a data storage unit separate from the embeddings space generator 200, or according to some embodiments a data storage unit that is part of the embeddings space generator 200.

The order of following steps 302 and 303 may be interchanged, or implemented to run concurrently such that there is at least some overlap. At 302, sample facts from the KG 100 are selected according to a predetermined sampling strategy (e.g., uniform sampling, or sampling based on predicate frequency) that selects some, but not all, of the available facts from the KG 100. The ESS tool 210 may select M number of sampled facts from the KG 100. For example, when M=3 the set of sampled facts from the KG 100 may include $t_1$={George works for Acme Inc.}, $t_2$={Mike born in Liverpool}, and $t_3$={Mike is a Person}. The set of sampled facts are later applied during subsequent processes such as the generation of candidate embeddings spaces at 303 and the application of a ranking strategy at 304, which are both described in more detail below. The set of sampled facts may be selected using sampling circuitry 320 included in the embeddings space generator 200.

At 303, the ESS tool 210 generates a plurality of candidate embeddings spaces. The generation of the candidate embeddings spaces may be implemented by a generation circuitry 330 of the embeddings space generator 200. The candidate embeddings spaces may be generated randomly according to a random initialization model, to generate a set of N embeddings spaces $\{E_1, E_2, \ldots, E_N\}$. Further, the candidate embeddings spaces may be generated to include point coordinates corresponding to the set of sampled facts that are selected from the KG 100, and not necessarily the entire set of facts included in the KG 100. This sampling strategy allows for the conservation of computing resources in the form of, at least, faster processing and conserved data storage.

At 304, the ESS tool 210 applies the ranking strategy based, at least, on the set of candidate embeddings spaces and the set of sampled facts from the KG 100. The ranking strategy may be implemented by a processing circuitry 340 of the embeddings space generator 200. A more detailed description of the ranking strategy according to some embodiments is illustrated by the flow diagram shown in FIG. 3B.

Figure 3B:
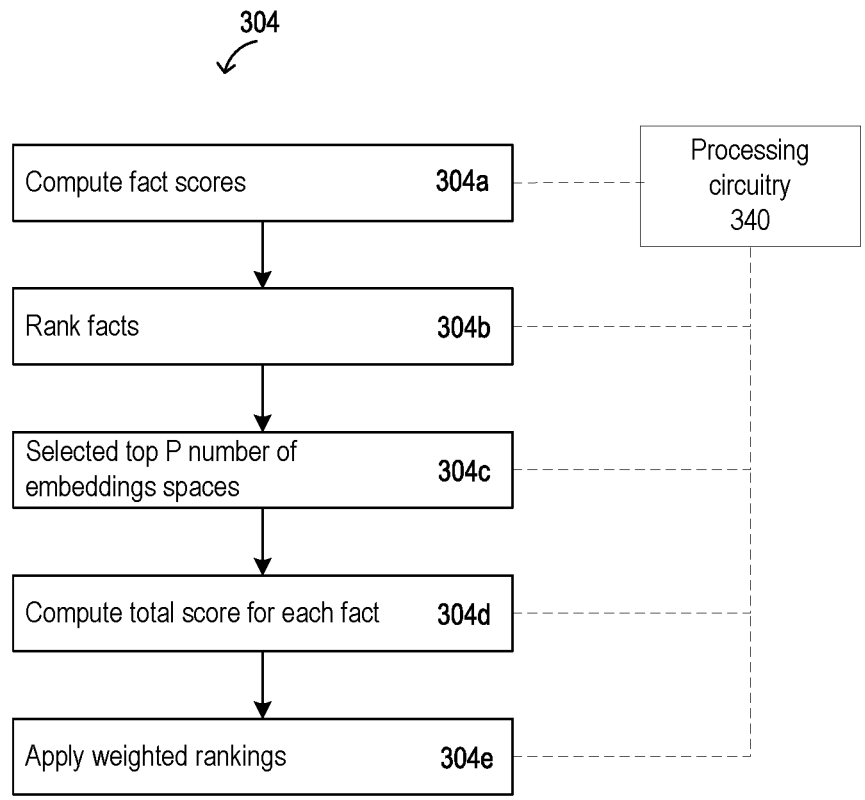
FIG. 3B shows an exemplary flow diagram describing a ranking strategy, according to some embodiments.

In FIG. 3B, at 304a the ESS tool 210 computes fact scores for each of the candidate embeddings spaces by scoring the set of sampled facts that are included in each of the candidate embeddings spaces. The fact scores represent a likelihood of the factual correctness of the representative fact, which in this case is the sampled facts. A higher fact score is designed to represent a higher ranking and relative greater likelihood of the factual correctness. The set of sampled facts correspond to M number of triples t from the KG 100. The scoring may be any known scoring function $f(t_M, E_N)$, such as a weighted mean reciprocal rank (MRR) that uses a weight assigned to the fact triples and the ranks. The assigned weight may be the same value as a default weight value. According to other embodiments, the scoring function may apply other known learning to rank metric such as a mean rank, or hits at N. The scoring applied to the candidate embeddings spaces $\{E_1\text{-}E_N\}$ may be represented by Table 1 below (including exemplary scoring values). According to some embodiments, the candidate embeddings spaces $\{E_1\text{-}E_N\}$ may include one or more negative fact triples instead of completely removing the use of the negative fact triples. The scoring methodology for the negative fact triples would be the same as for positive fact triples shown in Table 1, but then taking the inverse of the score, where the inversed score would be used for the overall ranking with the other fact triples.

TABLE 1

| | $E_1$ | $E_2$ | ... | $E_N$ |
|---|---|---|---|---|
| $t_1$ = <George works for Acme Inc.> | $f(t_1, E_1) = 1.86$ | $f(t_1, E_2) = -5.4$ | ... | $f(t_1, E_N) = 4.73$ |
| . . . | | | | ... |
| $t_M$ = <Mike is a Person> | $f(t_M, E_1) = 3.45$ | $f(t_M, E_2) = 7.89$ | ... | $f(t_M, E_N) = -2.78$ |

At 304b, the ESS tool 210 ranks each of the candidate embeddings spaces $\{E_1\text{-}E_N\}$ based on their score from the previous step 304a.

At 304c, the ESS tool 210 selects the top P number of candidate embeddings spaces $\{E_1\text{-}E_N\}$, where the top embeddings spaces are those having the best (i.e., highest scores) rankings across all the facts triples $\{t_1\text{-}t_M\}$ included in the set of sampled facts. It is noted that the numbers described herein relating to N, M, and P may be a predetermined integer value. So in the example provided by Table 1, the top candidate embeddings space for fact triple $t=t_1$ is embedding space $E_N$ having the highest score of 4.73 amongst all other candidate embeddings spaces in the row corresponding to $t=t_1$. The top candidate embeddings space for fact triple $t=t_M$ is embedding space $E_2$ having the highest score of 7.89 amongst all other candidate embeddings spaces $\{E_1\text{-}E_N\}$ in the row corresponding to $t=t_M$.

At 304d, the ESS tool 210 computes the total score reached across each of the candidate embeddings spaces $\{E_1\text{-}E_N\}$ for their fact triples $t_M$, and finds the fact triple t with the lowest value, where the fact triple t with the lowest value is identified to be the hardest fact triple, where the hardest fact triple is the one for which all the models have a comparatively low fact score:

$$h = \mathrm{argmin}\ (\Sigma_i f(t_i, E_j)\ j \in N)$$

At 304e, the hardest fact triple is weighted into the rankings by duplicating the hardest fact triple in the scoring process, and updating the rankings accordingly. In the example provided by Table 1, the total score for fact triple $t=t_1$ is $(1.82 + -5.4 + 4.73 = 1.15)$. The total score for fact triple $t=t_M$ is $(3.45 + 7.89 + -2.7 = 8.64)$. So according to the exemplary scores from Table 1, the hardest fact triple is fact triple $t=t_1$. Therefore, fact triple $t=t_1$ is duplicated in Table 1 as a weighting function to compensate for it being the hardest. Table 2 below shows how Table 1 is updated to include the duplicate entry for the hardest fact triple $t=t_1$.

TABLE 2

| | $E_1$ | $E_2$ | ... | $E_N$ |
|---|---|---|---|---|
| $t_1$ = <George works for Acme Inc.> | $f(t_1, E_1) = 1.86$ $2^{nd}$ | $f(t_1, E_2) = -5.4$ $3^{rd}$ | ... | $f(t_1, E_N) = 4.73$ $1^{st}$ |
| . . . | | | | |
| $t_M$ = <Mike is a Person> | $f(t_M, E_1) = 3.45$ $2^{nd}$ | $f(t_M, E_2) = 7.89$ $1^{st}$ | ... | $f(t_M, E_N) = -2.78$ $3^{rd}$ |
| $t_h$ = <George works for Acme Inc.> | $f(t_h, E_1) = 1.86$ $2^{nd}$ | $f(t_h, E_2) = -5.4$ $3^{rd}$ | ... | $f(t_h, E_N) = 4.73$ $1^{st}$ |

After compensating for the hardest fact triple, each of the candidate embeddings spaces $\{E_1\text{-}E_N\}$ are ranked based on how they scored for each of the fact triples $\{t_1\text{-}t_M\}$. In the example provided by Table 2, the candidate embeddings spaces are ranked as follows (highest first): $E_1 > E_2 = E_N$.

Referring back to FIG. 3A, at 305 the ESS tool 210 receives the rankings results for the set of candidate embeddings spaces, and determines whether a stopping condition is met. For example, the stopping condition may determine whether one or more of the candidate embeddings spaces have been scored to meet or exceed a predetermined minimum score. Another stopping condition may be the passing of a predetermined length of time or number of iteration cycles, or a determination that there is a lack of improvement over previously run cycles. If the stopping condition is met, the ESS tool 210 selects the highest ranking candidate embedding space as the "best" embedding space 250 (also referred to as the selected embeddings space 250).

However when the stopping condition is not met, at 306 the ESS tool 210 applies a searching strategy to generate new candidate embeddings spaces for further ranking. These new candidate embeddings spaces are then inserted into the ranking strategy at 304 to initiate a new ranking cycle. The applied searching strategy may be implemented by an offspring generation circuitry included in the embeddings space generator 200. The offspring generation circuitry will derive new candidate embeddings spaces from the best (i.e., highest ranked) candidate embeddings spaces that were previously generated.

The generation of the new candidate embeddings spaces may be a strategic algorithm that balances exploration (i.e., new embeddings spaces that are significantly different from parent embeddings spaces that have already been analyzed for rankings, otherwise may be referred to as a "combination" or "crossover" of two or more parents) versus exploitation (i.e., new embeddings spaces that are slight variants of a parent embeddings space from which it derives, otherwise may be referred to as a "mutation" of a parent).

Figure 3C:
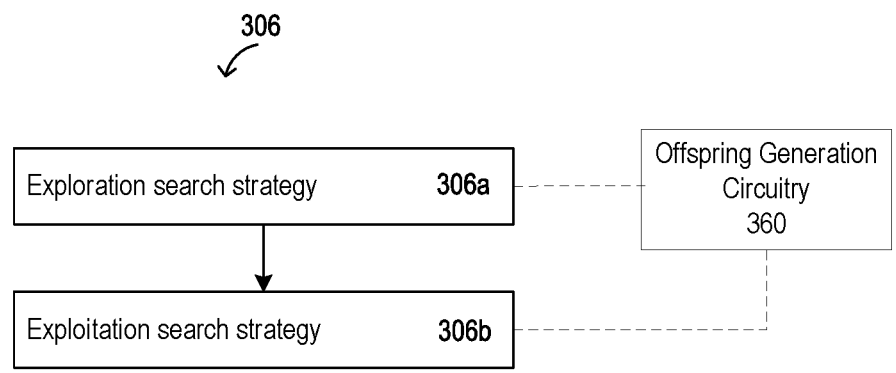
FIG. 3C shows an exemplary flow diagram describing a search strategy, according to some embodiments.

Referring to FIG. 3C, a search strategy for generating new candidate embeddings spaces that includes both an exploration search strategy and an exploitation search strategy is illustrated. Generally speaking, the ESS tool 210 obtains the top P number of previously ranked candidate embeddings spaces to generate a new set of N candidate embeddings spaces under the search strategy, where N is a predetermined number that may be different, or the same, as the number of candidate embeddings spaces that were initially generated. The search strategy implements both an exploration search strategy and an exploitation search strategy, and so the number of new candidate embeddings spaces that will be generated using the exploration search strategy and the exploitation search strategy will be determined under a predetermined exploration ratio e: $(1-e)*(N-P)$ embeddings under the exploitation search strategy, and $e*(N-P)$ embeddings under the exploration search strategy, for a total of N new candidate embeddings spaces. A more details description of the two search strategies is provided below. The search strategy implemented by the ESS tool 210 is illustrated by block diagram 370 in FIG. 3D.

At 306a in FIG. 3C, the ESS tool 210 implements the exploration search strategy. Under the exploration search strategy, the ESS tool 210 takes a random set of k candidate embeddings spaces (i.e., parents), with $k \in [2, P]$ and k being influenced by the previous rankings of the candidate embeddings spaces at step 304 in the flow diagram 300. Then from the combination of the k candidate embeddings spaces, the ESS tool 210 computes a weighed barycenter that combines the coordinate points from the k candidate embeddings spaces.

Figure 3D:
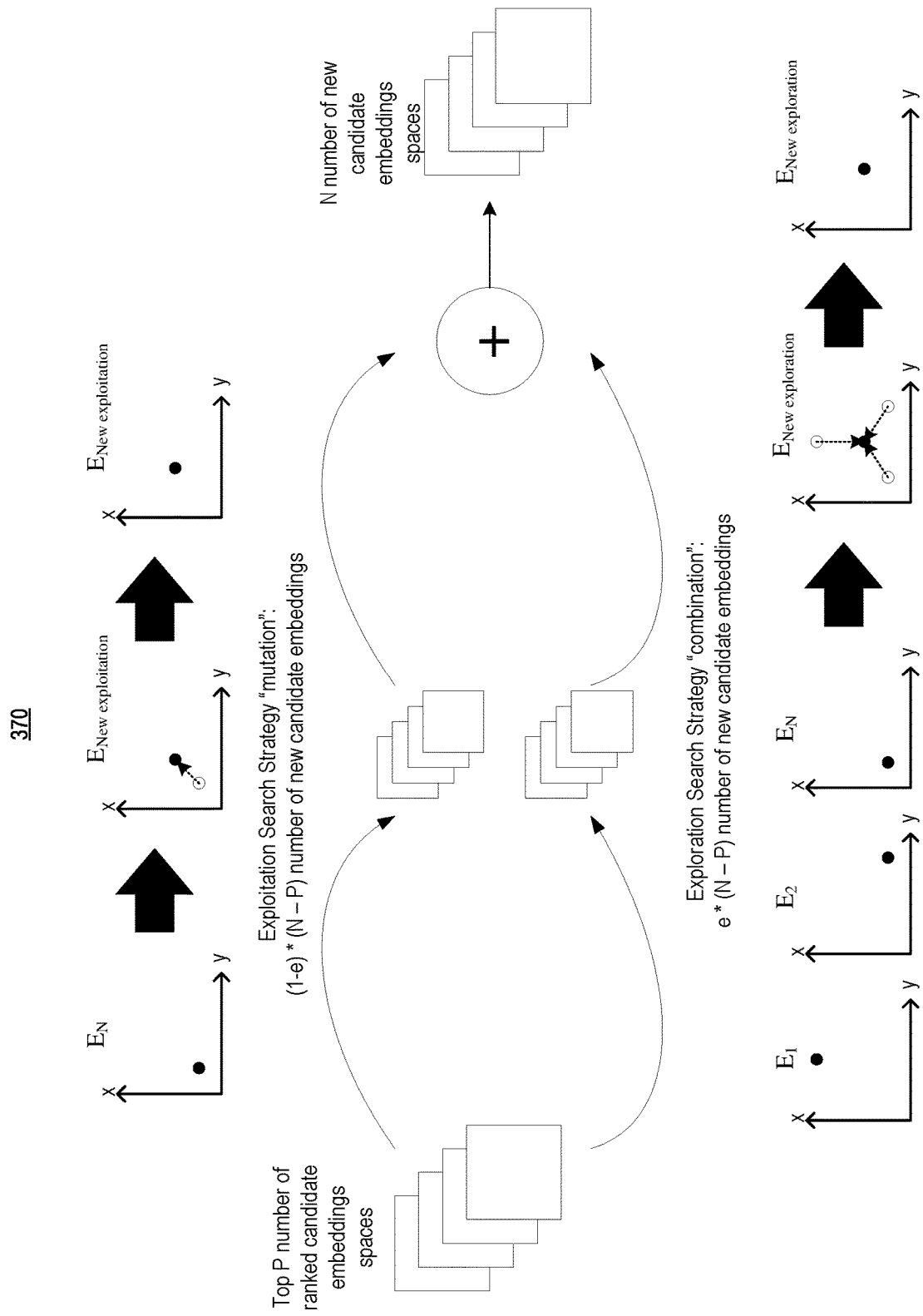
FIG. 3D shows an exemplary block diagram describing a search strategy, according to some embodiments.

An example combination of candidate embedding spaces that results in a new candidate embedding space using the exploration search strategy is shown in the block diagram 370 illustrated in FIG. 3D. In the example shown in block diagram 370, the exploration search strategy equally combines the parent candidate embeddings spaces by calculating the mean amongst the three parent candidate embeddings spaces to calculate the new candidate embedding space. However, under other embodiments the exploration search strategy may unequally distribute the combination of parent candidate embeddings spaces by giving additional weight to higher ranked parent candidate embeddings spaces respectively. For example, $E_N$ may be weighted greater than $E_2$ and $E_1$, because $E_N$ was previously ranked higher.

At 306b in FIG. 3C, the ESS tool 210 implements the exploitation search strategy. Under the exploitation search strategy, the ESS tool 210 selects one of the previously generated parent candidate embeddings spaces. The selection of one of the previously generated parent candidate embeddings spaces is influenced by the previous rankings of the candidate embeddings spaces at step 304 in the flow diagram 300.

The exploitation search strategy then picks a concept at random, where the concept is one of the subjects in the fact triples from the set of sampled facts selected at step 302 in the flow diagram 300. For example, the concept may be "Mike". The number of times the concept "Mike" is included in the fact triples corresponding to the set of sampled facts is assigned to a inertia variable α. In the case where the concept is "Mike", "Mike" is shown to be included in two out of the three fact triples that comprise the set of sampled facts (e.g., $t_1$={George works for Acme Inc.}, $t_2$={Mike born in Liverpool}, and $t_3$={Mike is a Person}). So in the case where the concept is "Mike", the inertia variable α=2/3.

As described, the exploitation search strategy looks to generate a new candidate embedding space that is a slight variation on a parent candidate embeddings space. The parent candidate embeddings spaces that are selected for mutation may be a predetermined number N of one or more of the highest ranking parent candidate embeddings spaces. The actual mutation comprises moving only the coordinate point in the parent candidate embeddings space that correspond to the concept (e.g., points representing "Mike"). The higher the value of the inertia variable a, the lower the amount the point corresponding to the selected concept will move in the new candidate embeddings space. As part of the exploitation search strategy, the ESS tool 210 may further extract all other concepts that are connected to the selected concept. In the example, this extraction process may look to remove the points corresponding to the concepts {"Liverpool" and "Person"} because these two concepts are connected to the selected concept "Mike".

The positional adjustment of the point corresponding to the selected concept "Mike" may be calculated accordingly to create a new set of candidate embeddings spaces having the modified positions for the points corresponding to the selected concept "Mike" while leaving the other points unchanged:

$$E(\text{Mike}) = \alpha + E(\text{Mike}) + \sum_{c \in R} \frac{(1-\alpha)}{R} E(c)$$

The new set of candidate embeddings spaces that are generated under this exploitation search strategy are thus slight mutations from the set of parent candidate embeddings spaces from which they are derived from.

So following the process described by the flow diagram 300, the ESS tool 210 ultimately selects a "best" candidate embeddings space to be the selected embeddings space 250. This selected embeddings space 250 is then used by the ESS tool 210 to run through a scoring function to determine the new fact.

Figure 4:
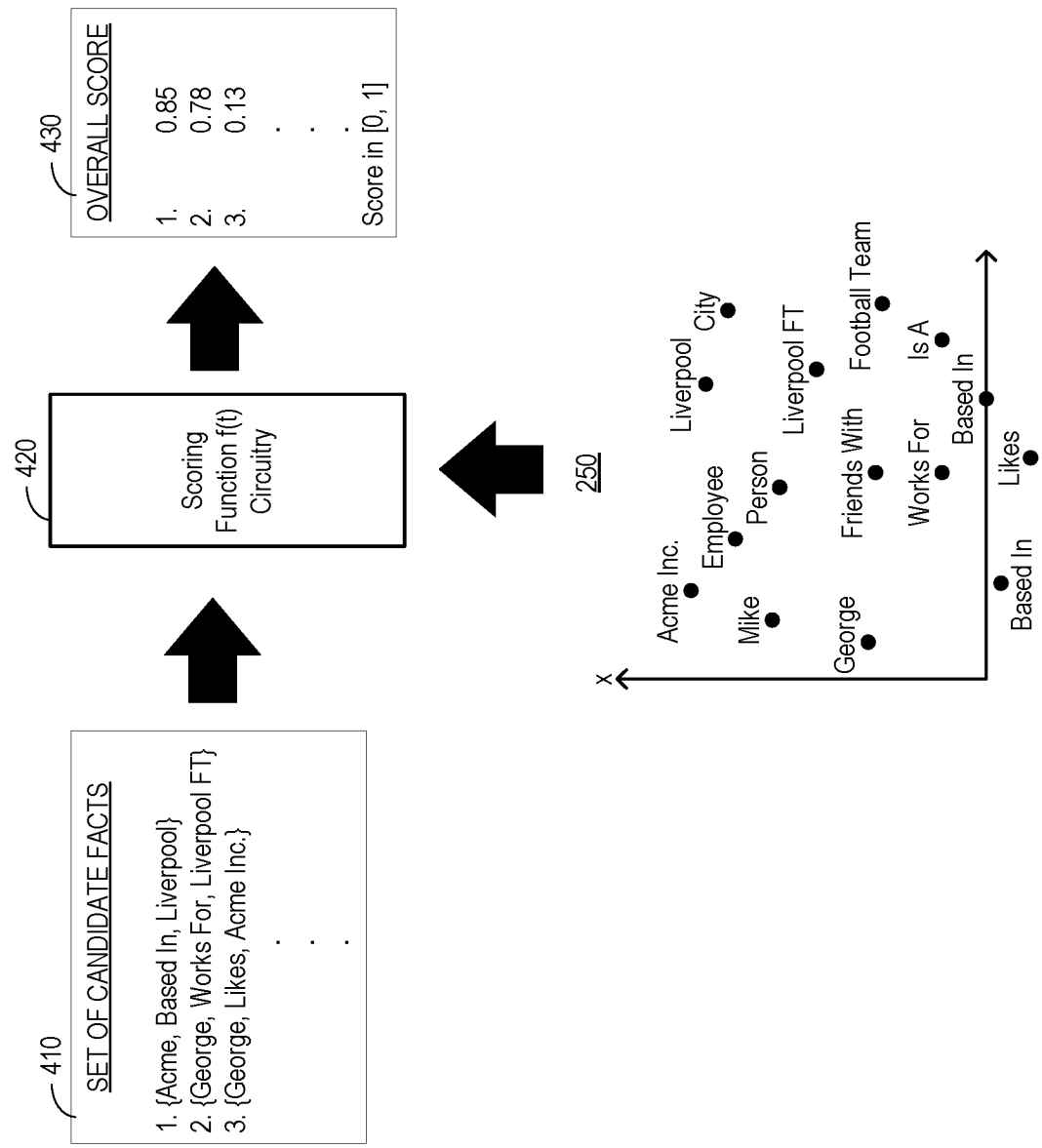
FIG. 4 shows an exemplary block diagram for a scoring circuitry utilized during an inference process, according to some embodiments.

For example, as shown in FIG. 4 both the selected embeddings space 250 and a set of candidate facts 410 may be input to a scoring function f(t) circuitry 420 ("scoring circuitry"), to calculate an overall score 430 for each of the candidate facts in the set of candidate facts 410. According to some embodiments, the set of candidate facts 410 may be created by a random generator that selects concepts and relationships existing in the KG 100, and combine them randomly into the candidate facts in the set of candidate facts 410. According to some embodiments, the set of candidate facts 410 may be selected from a lookup table including a database of candidate facts, where a random selection generator selects a number of candidate facts from the database to be included in the set of candidate facts 410. The total number of candidate facts included in the set of candidate facts 410 may be a predetermined number. According to some embodiments, the total number of candidate facts included in the set of candidate facts 410 may be determined based on a separate analysis for promoting efficiency and calculations to conserve computing resources.

Table 3 below shows an exemplary set of candidate facts. As shown in Table 3, the candidate fact "Acme Based In Liverpool" is not directly found from the linked data of the KG 100, but is rather a candidate fact to be considered for selection as a new fact.

TABLE 3

{Acme, Based In, Liverpool}
{George, Works For, Liverpool FT}
{George, Likes, Acme Inc.}
. . .

With these two inputs to the scoring circuitry 420, the scoring circuitry 420 is configured to calculate an overall score according to the scoring function f(t) for one or more of the candidate facts included in the set of candidate facts 410. The resulting overall scores 430 may be analyzed by the ESS tool 210 to select one or more of the candidate facts as a new fact.

Figure 5:
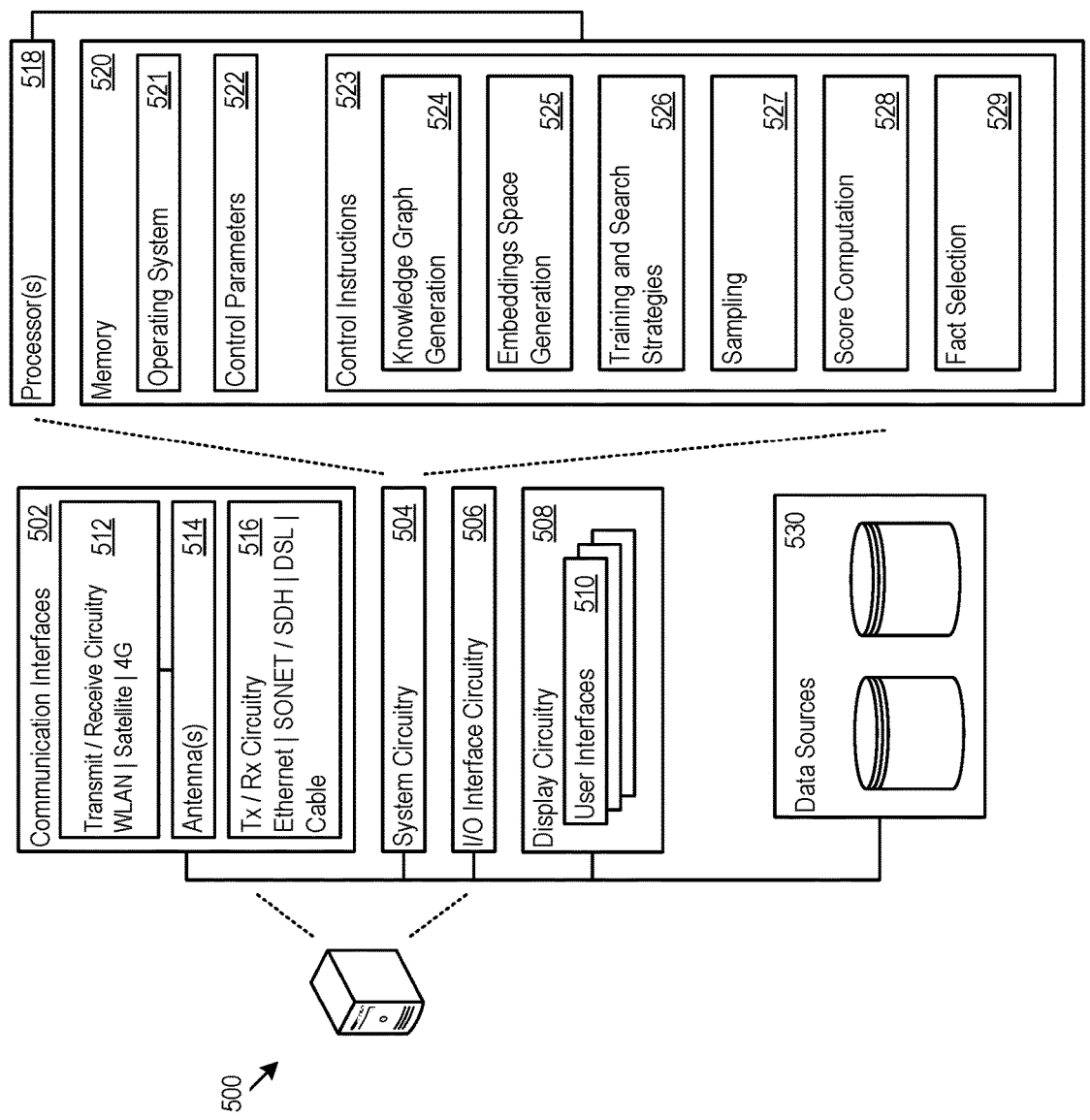
FIG. 5 shows an exemplary computer architecture for a computer device used to generate a new fact, according to some embodiments.

FIG. 5 illustrates an exemplary computer architecture of a computer device 500 on which features of the ESS tool 210 for determining the new facts may be executed. The computer device 500 may, for example, be representative of the embeddings space generator 200. The computer device 500 includes communication interfaces 502, system circuitry 504, input/output (I/O) interface circuitry 506, and display circuitry 508. The graphical user interfaces (GUIs) 510 displayed by the display circuitry 508 may be representative of GUIs generated by the ESS tool 210 to determine the new fact. The graphical user interfaces (GUIs) 510 displayed by the display circuitry 508 may also be representative of GUIs generated by the ESS tool 210 to receive knowledge graphs as inputs. The GUIs 510 may be displayed locally using the display circuitry 508, or for remote visualization, e.g., as HTML, JavaScript, audio, and video output for a web browser running on a local or remote machine. Among other interface features, the GUIs 510 may further render displays of any new knowledge graphs that have been supplemented with a new fact determined by the ESS tool 210 as described herein.

The GUIs 510 and the I/O interface circuitry 506 may include touch sensitive displays, voice or facial recognition inputs, buttons, switches, speakers and other user interface elements. Additional examples of the I/O interface circuitry 506 includes microphones, video and still image cameras, headset and microphone input/output jacks, Universal Serial Bus (USB) connectors, memory card slots, and other types of inputs. The I/O interface circuitry 506 may further include magnetic or optical media interfaces (e.g., a CDROM or DVD drive), serial and parallel bus interfaces, and keyboard and mouse interfaces.

The communication interfaces 502 may include wireless transmitters and receivers ("transceivers") 512 and any antennas 514 used by the transmit and receive circuitry of the transceivers 512. The transceivers 512 and antennas 514 may support WiFi network communications, for instance, under any version of IEEE 802.11, e.g., 802.11n or 802.11ac, or other wireless protocols such as Bluetooth, Wi-Fi, WLAN, cellular (4G, LTE/A, 5G). The communication interfaces 502 may also include serial interfaces, such as universal serial bus (USB), serial ATA, IEEE 1394, lighting port, I²C, slimBus, or other serial interfaces. The communication interfaces 502 may also include wireline transceivers 516 to support wired communication protocols. The wireline transceivers 516 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 504 may include any combination of hardware, software, firmware, APIs, and/or other circuitry. The system circuitry 504 may be implemented, for example, with one or more systems on a chip (SoC), application specific integrated circuits (ASIC), microprocessors, discrete analog and digital circuits, and other circuitry. The system circuitry 504 may implement any desired functionality of the ESS tool 210. As just one example, the system circuitry 504 may include one or more instruction processor 518 and memory 520.

The memory 520 stores, for example, control instructions 523 for executing the features of the ESS tool 210, as well as an operating system 521. In one implementation, the processor 518 executes the control instructions 523 and the operating system 521 to carry out any desired functionality for the ESS tool 210, including those attributed to knowledge graph generation 524, embeddings space generation 525, training and search strategies 526, sampling 527, score computation 528, and/or fact selection 529. The control parameters 522 provide and specify configuration and operating options for the control instructions 523, operating system 521, and other functionality of the computer device 500.

The computer device 500 may further include various data sources 530. Each of the databases that are included in the data sources 530 may be accessed by the ESS tool 210 to obtain data for consideration during any one or more of the processes described herein. For example, KG 100 may be stored on a database that is part of the data sources 530, or enterprise data for generating the KG 100 may be stored on a database that is part of the data sources 530.

Various implementations have been specifically described. However, other implementations that include a fewer, or greater, number of features and/or components for each of the apparatuses, methods, or other embodiments described herein are also possible.

What is claimed is:

1. A computing device comprising:
  a data reception circuitry configured to receive a knowledge graph including a set of structured data;
  a knowledge graph embedding circuitry configured to:
    select a sampled set of vector triples from the knowledge graph;
    convert the knowledge graph to a set of candidate embeddings spaces, wherein each of the candidate embeddings spaces includes a different set of vectors representing the sampled set of vector triples from the knowledge graph; and
  a processing circuitry configured to:
    calculate a weighted mean reciprocal rank of the sampled set of vector triples for each of the candidate embeddings spaces;
    determine a respective fact score for each of the candidate embeddings spaces based on the calculated weighted mean reciprocal rank;
    rank the candidate embeddings spaces according to their respective fact scores; and
    select a predetermined number of the highest ranked candidate embeddings spaces when a stopping condition is met.

2. The computing device of claim 1, wherein the processing circuitry is further configured to:
  obtain a set of candidate vector triples, wherein each vector triple represents a different candidate fact;
  determine prediction scores for the set of candidate vector triples in view of the selected highest ranked candidate embeddings spaces; and
  select a vector triple from the set of candidate vector triples as a new fact based on the prediction scores.

3. The computing device of claim 1, wherein the stopping condition includes at least one of when a fact score of at least one of the candidate embeddings spaces if greater than a predetermined selection threshold, when a predetermined period has passed, or when an improvement in the fact scores for plurality of candidate embeddings spaces is less than a predetermined amount compared to a previous iteration.

4. The computing device of claim 1, wherein the processing circuitry is further configured to:
  generate a new set of candidate embeddings spaces according to a search strategy when a stopping condition is not met, wherein the search strategy comprises both an exploration search strategy and an exploitation search strategy;
  calculate a weighted mean reciprocal rank of the sampled set of vector triples for each of the new set of candidate embeddings spaces;
  determine a respective fact score for each of the new set of candidate embeddings spaces based on the weighted mean reciprocal rank calculation;
  rank the new set of candidate embeddings spaces according to their respective fact scores; and
  select the predetermined number of the highest ranked new candidate embeddings spaces when the stopping condition is met.

5. The computing device of claim 4, wherein the processing circuitry is configured to generate a new candidate embeddings space according to the exploration search strategy by combining at least two candidate embeddings spaces from the selected highest ranked candidate embeddings spaces as a weighted average of the at least two candidate embeddings spaces from the selected highest ranked candidate embeddings spaces.

6. The computing device of claim 5, wherein the processing circuitry is configured to determine a weighted average of nodes in each of the at least two candidate embeddings spaces.

7. The computing device of claim 4, wherein the processing circuitry is configured to generate a new candidate embeddings space according to the exploitation search strategy by modifying a position of a vector included in a highest ranked candidate embeddings space.

8. The computing device of claim 7, wherein the processing circuitry is configured to determine the modified position of the vector based on a position of other connected nodes.

9. The computing device of claim 4, wherein the processing circuitry is configured to generate the new set of candidate embeddings spaces according to a predetermined ratio that includes a first predetermined number of new candidate embeddings spaces using the exploration search strategy and a second predetermined number of new candidate embeddings spaces using the exploitation search strategy.

10. The computing device of claim 1, wherein the processing circuitry is further configured to:
determine an initial ranking score for each combination of the sampled set of vector triples for each of the candidate embeddings spaces;
determine a mean of the initial ranking scores for each of the candidate embeddings spaces;
determine a corner case weighting for each combination of the sampled set of vector triples; and
wherein the weighted mean reciprocal rank is calculated based on the mean of the initial ranking scores and the corner case weighting.

11. A method comprising:
receiving, by a reception circuitry, a knowledge graph including a set of structured data;
selecting, by a knowledge graph embedding circuitry, a sampled set of vector triples from the knowledge graph;
converting, by the knowledge graph embedding circuitry, the knowledge graph to a set of candidate embeddings spaces, wherein each of the candidate embeddings spaces includes a different set of vectors representing the sampled set of vector triples from the knowledge graph;
calculating, by a processing circuitry, a weighted mean reciprocal rank of the sampled set of vector triples for each of the candidate embeddings spaces;
determining, by the processing circuitry, a respective fact score for each of the candidate embeddings spaces based on the calculated weighted mean reciprocal rank;
ranking, by the processing circuitry, the candidate embeddings spaces according to their respective fact scores; and
selecting, by the processing circuitry, a predetermined number of the highest ranked candidate embeddings spaces when a stopping condition is met.

12. The method of claim 11, further comprising:
obtaining, by the processing circuitry, a set of candidate vector triples, wherein each vector triple represents a different candidate fact;
determining, by the processing circuitry, prediction scores for the set of candidate vector triples in view of the selected highest ranked candidate embeddings spaces; and
selecting, by the processing circuitry, a vector triple from the set of candidate vector triples as a new fact based on the prediction scores.

13. The method of claim 11, wherein the stopping condition includes at least one of when a fact score of at least one of the candidate embeddings spaces if greater than a predetermined selection threshold, when a predetermined period has passed, or when an improvement in the fact scores for plurality of candidate embeddings spaces is less than a predetermined amount compared to a previous iteration.

14. The method of claim 11, further comprising:
generating, by the processing circuitry, a new set of candidate embeddings spaces according to a search strategy when a stopping condition is not met, wherein the search strategy comprises both an exploration search strategy and an exploitation search strategy;
calculating, by the processing circuitry, a weighted mean reciprocal rank of the sampled set of vector triples for each of the new set of candidate embeddings spaces;
determining, by the processing circuitry, a respective fact score for each of the new set of candidate embeddings spaces based on the weighted mean reciprocal rank calculation;
ranking, by the processing circuitry, the new set of candidate embeddings spaces according to their respective fact scores; and
selecting, by the processing circuitry, the predetermined number of the highest ranked new candidate embeddings spaces when the stopping condition is met.

15. The method of claim 14, wherein generating the new set of candidate embeddings spaces comprises generating a new candidate embeddings space according to the exploration search strategy by combining at least two candidate embeddings spaces from the selected highest ranked candidate embeddings spaces as a weighted average of the at least two candidate embeddings spaces from the selected highest ranked candidate embeddings spaces.

16. The method of claim 14, wherein generating the new set of candidate embeddings spaces comprises generating a new candidate embeddings space according to the exploitation search strategy by modifying a position of a vector included in a highest ranked candidate embeddings space.

17. The method of claim 14, wherein generating the new set of candidate embeddings spaces comprises generating the new set of candidate embeddings spaces according to a predetermined ratio that includes a first predetermined number of new candidate embeddings spaces using the exploration search strategy and a second predetermined number of new candidate embeddings spaces using the exploitation search strategy.

18. A computing device comprising:
a processing circuitry; and
a non-transitory storage medium configured to store instructions that, when executed, causes the processing circuitry to:
receive a knowledge graph including a set of structured data;
select a sampled set of vector triples from the knowledge graph;
convert the knowledge graph to a set of candidate embeddings spaces, wherein each of the candidate embeddings spaces includes a different set of vectors representing the sampled set of vector triples from the knowledge graph;
calculate a weighted mean reciprocal rank of the sampled set of vector triples for each of the candidate embeddings spaces;
determine a respective fact score for each of the candidate embeddings spaces based on the calculated weighted mean reciprocal rank;
rank the candidate embeddings spaces according to their respective fact scores; and
select a predetermined number of the highest ranked candidate embeddings spaces when a stopping condition is met.

19. The computing device of claim 18, wherein the instructions, when executed, further causes the processing circuitry to:
obtain a set of candidate vector triples, wherein each vector triple represents a different candidate fact;

determine prediction scores for the set of candidate vector triples in view of the selected highest ranked candidate embeddings spaces; and select a vector triple from the set of candidate vector triples as a new fact based on the prediction scores.

20. The computing device of claim 18, wherein the instructions, when executed, further causes the processing circuitry to:

generate a new set of candidate embeddings spaces according to a search strategy when a stopping condition is not met, wherein the search strategy comprises both an exploration search strategy and an exploitation search strategy;

calculate a weighted mean reciprocal rank of the sampled set of vector triples for each of the new set of candidate embeddings spaces;

determine a respective fact score for each of the new set of candidate embeddings spaces based on the weighted mean reciprocal rank calculation;

rank the new set of candidate embeddings spaces according to their respective fact scores; and select the predetermined number of the highest ranked new candidate embeddings spaces when the stopping condition is met.

* * * * *